United States Patent
Akutsu et al.

(10) Patent No.: US 7,176,249 B2
(45) Date of Patent: Feb. 13, 2007

(54) AQUEOUS INK COMPOSITION, MANUFACTURING METHOD THEREFOR AND IMAGE FORMING METHOD USING THE SAME

(75) Inventors: Eiichi Akutsu, Ashigarakami-gun (JP); Shigemi Ohtsu, Ashigarakami-gun (JP); Keishi Shimizu, Ashigarakami-gun (JP); Kazutoshi Yatsuda, Ashigarakami-gun (JP); Takeshi Mikami, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 254 days.

(21) Appl. No.: 10/390,700

(22) Filed: Mar. 19, 2003

(65) Prior Publication Data
US 2004/0048973 A1    Mar. 11, 2004

(30) Foreign Application Priority Data
Sep. 11, 2002    (JP) .............................. 2002-265571

(51) Int. Cl.
| | |
|---|---|
| *C09D 11/10* | (2006.01) |
| *C08L 33/02* | (2006.01) |
| *C08L 33/08* | (2006.01) |
| *C08L 33/10* | (2006.01) |
| *C08L 25/08* | (2006.01) |
| *C08L 23/00* | (2006.01) |
| *B41J 2/01* | (2006.01) |

(52) U.S. Cl. ...................... 523/160; 524/556; 524/560; 524/577; 347/101

(58) Field of Classification Search ................ 523/160, 523/161; 524/556, 560, 577; 347/100, 101; 106/31.6
See application file for complete search history.

(56) References Cited

U.S. PATENT DOCUMENTS

| | | | | | |
|---|---|---|---|---|---|
| 5,160,370 | A | * | 11/1992 | Suga et al. ................. | 524/376 |
| 5,334,649 | A | * | 8/1994 | Fujita .......................... | 524/558 |
| 5,658,376 | A | * | 8/1997 | Noguchi et al. .......... | 106/31.43 |
| 5,948,149 | A | * | 9/1999 | Ito et al. ................... | 106/31.13 |
| 5,981,651 | A | * | 11/1999 | Patel et al. ................ | 524/773 |
| 6,245,832 | B1 | * | 6/2001 | Suzuki et al. .............. | 523/160 |
| 6,498,202 | B1 | * | 12/2002 | Sun et al. .................. | 523/160 |
| 2003/0055129 | A1 | * | 3/2003 | Alford ........................ | 523/160 |

OTHER PUBLICATIONS

Lewis, Sr., Richard J.; Hawley's Condensed Chemical Dictionary 13th Ed., John Wiley & Sons, New York, 1997 (p. 791).*

* cited by examiner

*Primary Examiner*—Callie Shosho
(74) *Attorney, Agent, or Firm*—Oliff & Berridge, PLC (57) ABSTRACT

The invention provides an aqueous ink composition, which comprises at least: 1) an alkali neutralized product of a copolymer containing constituent units of: (i) at least one monomer selected from the group consisting of alkene, styrene, styrene derivatives, vinyl naphthalene, and vinyl naphthalene derivatives; (ii) at least one monomer selected from monomers containing an acidic group that ion dissociate; and (iii) at least one α,β-ethylenic unsaturated carboxylic acid alkyl ester; 2) a pigment; and 3) an aqueous medium, wherein the alkali neutralized product of the copolymer in the aqueous ink composition forms micelle aggregations with an average diameter being set in the range of 10 nm to 300 nm. A manufacturing method of the aqueous ink composition and an image forming method using the aqueous ink composition are also provided.

19 Claims, 1 Drawing Sheet

AQUEOUS INK COMPOSITION, MANUFACTURING METHOD THEREFOR AND IMAGE FORMING METHOD USING THE SAME

BACKGROUND OF THE INVENTION

1. Field of the Invention

The present invention relates to an aqueous ink composition, a manufacturing method therefor and an image forming method using said aqueous ink composition.

2. Description of the Related Art

Along with the recent increased awareness for environmental conservation, the application of aqueous media in place of organic solvents has been recommended and even legally imposed in various fields.

For example, in the paint field, there has been a strong demand for a switch from organic solvent-type paints to water-based paints and non-solvent-type paints (electrostatic powder paints, etc.). Moreover, in the printing field as well, there are demands for legal restrictions to impose the application of aqueous print inks in order to improve areas such as printing work environments. Hence, there has been a rush to develop aqueous print inks. However, aqueous inks are problematic in that pigment dispersion is still insufficient, a problem that has not been completely solved, and at present, images formed by using an aqueous print ink have problems in fastness, and, in particular, poor water-resistance. Accordingly, the current techniques do not provide adequate image properties for practical use. At present, in the case when a non-solvent-type ink needs to be obtained, an aqueous print ink with inferior image characteristics has to be used. Therefore, there is a need to further develop aqueous print inks having sufficient image characteristics.

An example of another recent application of aqueous inks is in image recording processes using ink-jet recording ink. Despite its simple structure and low power consumption, the ink-jet process makes it possible to record high-quality images, and in particular, recent advances have provided images that are equivalent to photographs in image quality.

With ink-jet recording, an aqueous ink is discharged through a nozzle in the form of fine droplets so as to adhere to a recording medium; thus, a recording process is carried out. Conventionally, dyes are used as coloring materials for such ink solutions, and an aqueous solution, which excels from the standpoint of surface tension, is generally selected as the ink medium in order to form an even solution system. The dye used as the coloring material is highly water-soluble and less susceptible to nozzle clogging than other materials, and the ink solution using such a dye has stable ink-discharging properties since its characteristics are similar to those of Newtonian fluid. Another advantage such dyes possesses is that a wide range of colors are available.

However, in general, water-soluble dye possesses inferior water resistance and light resistance when compared with pigment, hence an image recorded with ink containing a dye also has inferior water and light resistance. Such images also easily run. Moreover, most of these dyes are highly water-soluble, and tend to have strong electron bonds in their chemical structures, with the result that they tend to be ahrmful to humans. Moreover, ink-jet recording processes using dye-containing inks have failed to achieve sufficient color reproducibility on regular paper (although sufficient color reproduction range is obtainable if special paper is used).

Since ink-jet recording processes have come to be widely used, there has been an ever-increasing demand for improved recording characteristics, to the point that the same performance level as that of printed images has become required of ink-jet recorded images. Therefore, there is an urgent need to solve the above-mentioned problems regarding water and light resistance, color running, color reproducibility and safety, which are inherent problems with dye-containing ink.

Here, with respect to ink-jet recording ink using a pigment as the coloring material, various aspects have been developed and researched, specifically with polymer dispersants and aqueous solvents. However, at present, dispersants and solvents having sufficient characteristics have yet to be obtained.

For example, patent document 1 (identified below) discloses an ink-jet recording ink having improved clogging resistance, which serves as an ink containing a pigment, and contains an aqueous carrier medium, a nitrogen heterocyclic diol assistant solvent and a pigment dispersant (an aqueous dispersion of pigment particles that are stabilized by a polymer dispersant). Patent document 1 also discloses an AB or BAB block copolymer as a polymer dispersant (the A segment is an acrylic hydrophobic polymer, and the B segment is an acrylic hydrophilic polymer).

Moreover, patent document 2 (identified below) discloses an arrangement in which, in a recording solution containing a pigment, saccharides are used as moisturizers in place of ethylene glycol and the like so that the same moisture-retaining performance is achieved at a lower viscosity. Patent document 2 also discloses use of a copolymer of a monomer that is at least one member selected from the group consisting of styrene and vinyl naphthalene and their derivatives and further discloses using an unsaturated carboxylic acid such as acrylic acid is used as a polymer compound serving as a dispersant of the pigment.

Furthermore, patent document 3 (identified below) has disclosed that, with respect to a pigment dispersant of an aqueous ink-jet ink containing a pigment, an aqueous ink-jet ink having a stabilized pigment dispersing property is obtainable by using a block polymer composed of a hydrophobic polymer block having at least one basic amine functional group and a nonionic polymer block or a polymer block containing an acidic functional group.

Patent document 4 (identified below) discloses an ink-jet recording ink in which a pigment is dispersed by a polymer dispersant such as a styrene-methacrylic acid-acrylate copolymer.

All of the ink-jet recording inks disclosed in the above-mentioned patent documents contain a polymer compound (binder resin) as a dispersant for pigments, and the polymer compound contains an acidic group for assisting the dissolving property to water and a hydrophobic group having a high affinity for a pigment. Here, the above-mentioned polymer compound, which not only serves as a dispersant for a pigment but also has a function for making the pigment adhere to the recording medium, also makes it possible to prevent light diffusion on the particle surface caused by the pigment. Prevention of light diffusion is accomplished by coating the pigment with a polymer compound coating film, which consequently functions to improve the reflection density of the image.

Therefore, in order to improve the color density of a recorded image, it is preferable not only to increase the pigment concentration in the ink, but also to increase the polymer coating property on the pigment surface by increasing the content of a polymer compound in the ink.

However, in the case when a great amount of the polymer compound disclosed in any one of the above-mentioned patent documents 1 to 4 is added to the ink, the ink viscosity increases, making it impossible to apply as an ink-jet recording ink. Moreover, another problem is that an image recorded by using an ink disclosed in any one of the above-mentioned patent documents 1 to 4 has inferior resistance to water.

The above-mentioned patent documents are: patent document 1: Japanese Patent Application Laid-Open (JP-A) No. 5-214284 (paragraphs 0016, 0037-0053); patent document 2: JP-A No. 7-11182 (claims, paragraphs 0010, 0016-0025); patent document 3: JP-A No. 6-136311 (paragraphs 0016-0025); patent document 4: JP-A No. 2002-38061 (paragraphs 0051, 0054, 0102).

SUMMARY OF THE INVENTION

The present invention has been devised in order to solve and satisfy the above-mentioned problems and demands, and its object is to provide an aqueous ink composition which makes it possible to increase the density of a pigment and a binder resin, to maintain a stably dispersed pigment for a long time in such an ink without causing an increase in the viscosity, to provide a recorded image with high color tone and high picture quality as well as providing high endurance and high water resistance when an image-recording process is carried out by using the ink, and a manufacturing method for the above-mentioned aqueous ink composition as well as an image forming method using the above-mentioned aqueous ink composition.

The above-mentioned problems can be solved by providing the following aqueous ink composition, manufacturing method thereof and image forming method.

One aspect of the invention provides an aqueous ink composition, which comprises at least:

1) an alkali neutralized product of a copolymer containing constituent units of: (i) at least one monomer selected from the group consisting of alkene, styrene, styrene derivatives, vinyl naphthalene, and vinyl naphthalene derivatives; (ii) at least one monomer selected from monomers containing an acidic group that ion dissociate; and (iii) at least one $\alpha,\beta$-ethylenic unsaturated carboxylic acid alkyl ester; 2) a pigment; and 3) an aqueous medium, wherein the alkali neutralized product of the copolymer in the aqueous ink composition forms micelle aggregations with an average diameter being set in the range of 10 nm to 300 nm.

Another aspect of the invention provides the aqueous ink composition, wherein an acid value of the copolymer is in the range of 60 to 160.

Still another aspect of the invention provides the aqueous ink composition, wherein a number average molecular weight of the copolymer is in the range of 6,000 to 30,000.

Still another aspect of the invention provides the aqueous ink composition, wherein in the copolymer, the constituent unit (i) is in the range from 15 to 55% by weight; the constituent unit (ii) is in the range from 9 to 28% by weight; and the constituent unit (iii) is the range from 20 to 75% by weight.

Still another aspect of the invention provides the aqueous ink composition, wherein primary particles of the pigment have a number average particle size of 2 to 200 nm.

Still another aspect of the invention provides the aqueous ink composition, wherein a content of the copolymer is 0.1 to 35% by weight.

Still another aspect of the invention provides the aqueous ink composition, wherein a content of the pigment is 1 to 35% by weight.

Still another aspect of the invention provides the aqueous ink composition, wherein a content of a solid component of the aqueous ink composition is in the range from 2 to 40% by weight.

Still another aspect of the invention provides the aqueous ink composition, wherein the micelle aggregations contain an aqueous medium inside thereof.

Still another aspect of the invention provides the aqueous ink composition, wherein the copolymer forms a supernatant fluid and a deposition from a dissolved state or a colloidal state when the pH of the copolymer solution is changed to no more than 2.5.

Still another aspect of the invention provides the aqueous ink composition, wherein the pH of the aqueous ink composition is adjusted to a pH area that is 0.5 to 4.0 higher than a pH point at which the copolymer generates a supernatant fluid and a deposition from a dissolved state.

Still another aspect of the invention provides the aqueous ink composition, wherein a pH adjustment is carried out by using a pH adjusting agent having a boiling point of 40° C. to 150° C.

Still another aspect of the invention provides the aqueous ink composition, wherein the addition amount of the pH adjusting agent is in the range from 50 mmol/Kg to 20 mol/Kg.

Still another aspect of the invention provides the aqueous ink composition, further comprising 5 to 65% by weight of a moisturizer, wherein the moisturizer is a water-soluble liquid and has a boiling point of no less than 80° C. with a vapor pressure of no more than 100 mmHg.

Still another aspect of the invention provides the aqueous ink composition, further comprising 0.05 to 4% by weight of an antiseptic agent and/or an fungicide.

Still another aspect of the invention provides a manufacturing method of an aqueous ink composition comprising at least the steps of:

stirring a solution containing a copolymer, an alkali, and an aqueous medium, while maintaining the solution at a temperature that is higher than the glass transition point of the copolymer by not less than 15° C. so as to form micelle aggregations of an alkali neutralized product of the copolymer; and adding pigment fine particles to a solution containing the micelle aggregation so as to be dispersed therein, wherein the copolymer contains constituent units of:

(i) at least one monomer selected from the group consisting of alkene, styrene, styrene derivatives, vinyl naphthalene, and vinyl naphthalene derivatives;

(ii) at least one monomer selected from monomers containing an acidic group that ion dissociate; and (iii) at least one $\alpha,\beta$-ethylenic unsaturated carboxylic acid alkyl ester.

Still another aspect of the invention provides the manufacturing method of an aqueous ink composition, wherein an amount of the alkali used in the micelle aggregation forming process is less than the amount that is equivalent for neutralizing the total acidic groups in the copolymer by 2 equivalent % to 30 equivalent %.

Still another aspect of the invention provides the manufacturing method of an aqueous ink composition, wherein in the micelle aggregation forming process, the copolymer has a glass transition point in the range from 10° C. to 120° C., the retention temperature of the solution is set to a temperature higher than the glass transition point by 20° C. to 50° C., and the solution is stirred with applying ultrasonic vibration.

Still another aspect of the invention provides an image forming method, wherein an image is formed on a image formation surface of a recording medium by using the aqueous ink composition and then a heating process is carried out onto the image formation surface of the recording medium at a temperature of 50° C. to 150° C.

DETAILED DESCRIPTION OF THE PREFERRED EMBODIMENTS

An aqueous ink composition in accordance with the present invention comprises at least:

1) an alkali neutralized product of a copolymer containing constituent units of: (i) at least one monomer selected from the group consisting of alkene, styrene, styrene derivatives, vinyl naphthalene, and vinyl naphthalene derivatives; (ii) at least one monomer selected from monomers containing an acidic group that ion dissociate; and (iii) at least one $\alpha,\beta$-ethylenic unsaturated carboxylic acid alkyl ester; 2) a pigment; and 3) an aqueous medium, wherein the alkali neutralized product of the copolymer in the aqueous ink composition forms micelle aggregations with an average diameter being set in the range of 10 nm to 300 nm.

The average diameter of the micelle aggregation is preferably set to 20 nm to 200 nm, more preferably, 30 to 120 nm. When the average particle diameter of the micelle aggregation is smaller than 10 nm, the micelle aggregation fails to include pigment particles, and becomes difficult to adhere or adsorb them because of the contact area; moreover, even when adhered and adsorbed to the pigment surface, the adhered and adsorbed state are insufficient, causing an unstable dispersed state. In contrast, the average diameter of the micelle aggregation greater than 300 nm makes the solution cloudy, to cause an insufficient dispersion stability in the pigment and the subsequent shortened life in the aqueous ink composition, and also to make the dispersed pigment aggregate and grow in an image, resulting in undesired light scattering and turbidity; thus, the color reproduction range of an image is narrowed and the saturation of color is lowered.

The average diameter and dispersed state of the micelle aggregation are measured by a cryo TEM method, cryo SEM method, a dynamic light scattering method, a static light scatting method, a laser scattering method or the like.

In the aqueous ink composition of the invention, the pigment fine particles are dispersed and held by the micelle aggregation.

The above-mentioned micelle aggregation is an aggregate in which a plurality of neutralized products of the above-mentioned copolymer molecules are entangled with each other to form a particle shape. In the aqueous ink composition, a single micelle aggregation and/or a plurality of micelle aggregations are aggregated to be colloid-dispersed; thus, a stable colloid state is formed based upon the above-mentioned particle structure (it is considered that a structure formed by a plurality of micelle aggregations becomes difficult to aggregate with the other micelle aggregations, and that since most of the chains of polymer molecules are not opened wide in the solution, the interaction between the aggregations is small to maintain a state having a low viscosity). Moreover, since the micelle aggregation contains an aqueous medium inside thereof, it has a specific gravity that is close to the aqueous medium, thereby making it possible to form a stable colloid state, also from the viewpoint of weight. Furthermore, the diameter of the micelle aggregation has such a characteristic that it does not change greatly even when the pH value of the solution is changed slightly. The micelle aggregation of the invention having such a characteristic devotes greatly to the solution of problems with the invention, and provides superior characteristics to the aqueous ink composition as will be described below.

The pigment fine particles are held by the micelle aggregation. It is considered that, when the particle size of the pigment fine particles is smaller in comparison with the diameter of the micelle aggregation, the pigment fine particle is maintained inside each micelle aggregation and that when the particle size is greater in comparison with the diameter of the micelle aggregation, it is maintained by a plurality of micelle aggregations. Here, since it is possible to make the diameter of the micelle aggregations extremely smaller, even fine pigment particles can be dispersed and maintained in a sufficiently stable manner.

Figure 1:
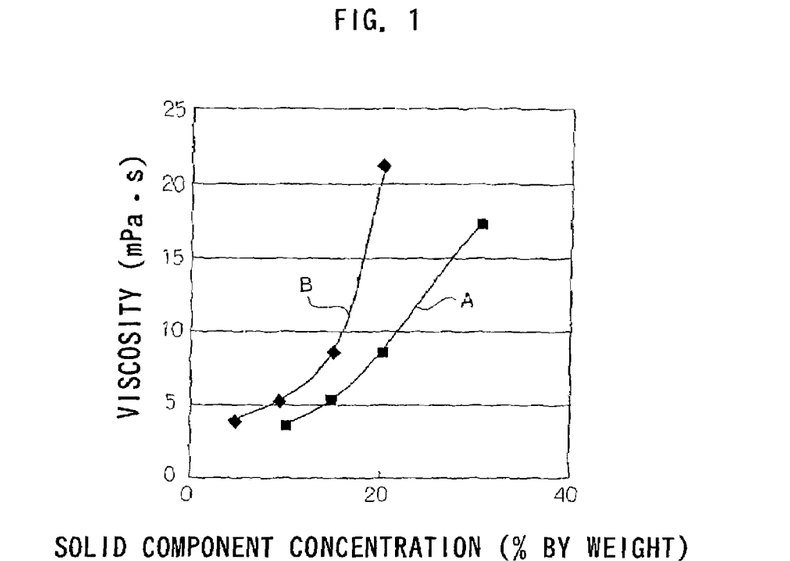
FIG. 1 is a graph that shows the relationship between the solid component concentration and the viscosity of a colloid solution containing a micelle aggregation and a resin solution serving as a contrast solution in accordance with the present invention.

Since the copolymer molecules in the aqueous ink composition of the invention form the above-mentioned micelle aggregation so as not to exist in a scattered manner as molecules in the solution; therefore, even when the content of the copolymer is made higher, it is possible to keep the viscosity of the solution lower with the viscosity being maintained stably for a long time. FIG. 1 shows the relationship between the solid component concentration (% by weight) and the viscosity of a colloid solution (styrene-acrylic acid-acrylic acid butyl ester copolymer) (curve A in the Figure) containing a micelle aggregation of the invention and a resin solution (styrene-acrylic acid copolymer) (curve B in the Figure) serving as a contrast solution. In the solution of the styrene-acrylic acid copolymer, the viscosity abruptly increases as the solid component reaches 20% by weight; however, in the case of the micelle aggregation colloid solution of the invention, although the viscosity also increases as the solid component viscosity increases, there is no abrupt increase in the viscosity until it has reached 30% by weight.

Moreover, since the pigment fine particles are maintained by the micelle aggregation, it is possible to make the aqueous ink composition contain a pigment with a high concentration, and also to keep the dispersing property in a stable manner.

Therefore, in the aqueous ink composition of the present invention, it becomes possible to increase both of the concentrations of the copolymer and the pigment without the necessity of increasing the viscosity of the solution, and to form a pigment/polymer coexisting substance on the surface of a recording medium such as paper in a film state; consequently, it is possible to widen the range of color reproduction to provide a high color tone image even when plain paper is used, and also to provide a high-quality image with high density of the image without impairing other characteristics (for example, ink-jet nozzle discharging characteristic and printing characteristic). Moreover, it is necessary for the printing-use ink composition to normally contain approximately 20 to 30% by weight of solid components (resin binder+color material), and since the aqueous ink composition of the invention achieves such an amount of solid components, it is used as the printing-use ink composition to provide an image with a high optical reflection density.

Moreover, since the pigment fine particles in the aqueous ink composition are contained inside the micelle aggregation, the pigment in an image coat film is maintained inside the copolymer resin coat film to make the pigment less susceptible to separation (image endurance), and since, even upon contact with water, the color material is not re-dispersed, it is possible to prevent the generation of image running (water-resistance). Moreover, since the diameter of the micelle aggregation is made extremely smaller, even fine pigment particles can be sufficiently dispersed and maintained stably, and it is possible to allow the printed image to have a highly color transparent property with a wide range of color reproduction (high color tune image).

Moreover, the copolymer used in the invention is a copolymer having units derived from the above-mentioned specific monomers, and, in particular, by using a styrene monomer and the like having a high hydrophobic property, the resin portion constituting the image coat film is allowed to have a high water resistance. Because of this property and the fact that pigment particles are contained inside the micelle aggregation, it is possible to allow an image formed by using the aqueous ink composition of the invention to have extremely high water-resistance and fastness.

Figure 2:
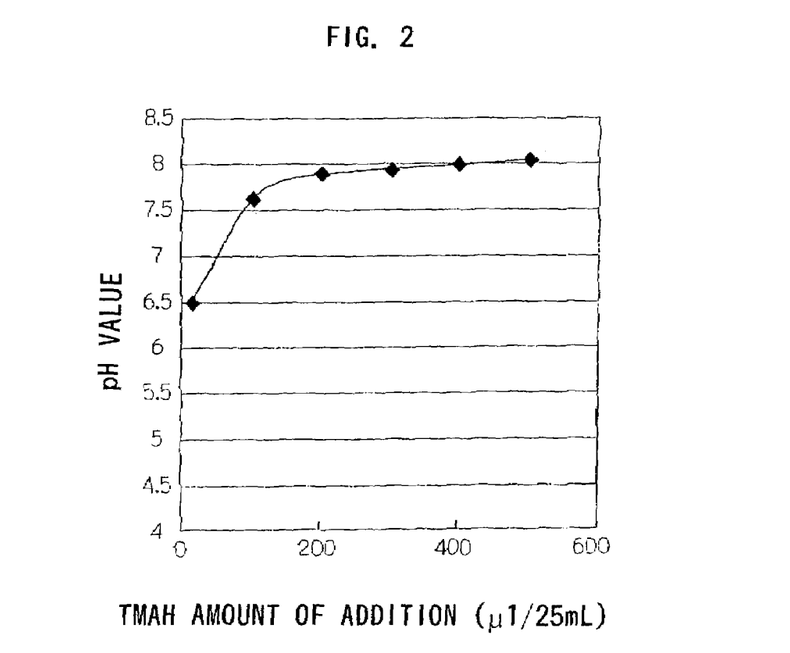
FIG. 2 is a graph that shows changes in the pH of the colloid solution when an alkali agent is added to the colloid solution containing the micelle aggregation of the invention.

As described above, since the aqueous ink composition of the invention contains the micelle aggregation to exert a buffering function (interference with pH changes), it eliminates the necessity of adding a normally-used pH buffering agent to the ink. FIG. 2 shows changes in the pH of a colloid solution when an alkali agent (TMAH ($N^+(CH_3)_4OH^-$)) is added to a colloid solution containing the micelle aggregation of the invention (styrene-acrylic acid-butylacrylate copolymer).

Moreover, since the aqueous ink composition uses a pigment as the color material, it is of course possible to provide images that are less susceptible to image running.

Furthermore, in the case when the aqueous ink composition of the invention is used for ink-jet recording, since the micelle aggregation contains water inside thereof, the moisture-retaining property exerts a moisturizing effect so that it becomes possible to ensure the reliability of the ink discharging property (nozzle clogging prevention, etc.).

Micelle Aggregation

The following description will discuss the micelle aggregation in accordance with the invention.

Copolymer

The copolymer, which constitutes the micelle aggregation, is a copolymer containing constituent units of: (i) at least one monomer selected from the group consisting of alkene, styrene, styrene derivatives, vinyl naphthalene, and vinyl naphthalene derivatives; (ii) at least one monomer selected from monomers containing an acidic group that ion dissociate; and (iii) at least one $\alpha,\beta$-ethylenic unsaturated carboxylic acid alkyl ester.

The unit (i) at least one monomer selected from the group consisting of alkene, styrene, styrene derivatives, vinyl naphthalene, and vinyl naphthalene derivatives is superior in the hydrophobic property to strongly adsorb pigment fine particles, thereby stabilizing the pigment dispersion. Moreover, the above-mentioned constituent unit contributes to the water-resistance of an image thus formed by its hydrophobic property, and also provides fastness to the image portion. Furthermore, the above-mentioned constituent unit gives effects on suppression in the ion dissociating function of the monomer containing an acidic group for dissociating ions in the copolymer.

The number of carbon atoms in the alkene is preferably set to approximately 2 to 20, more preferably, 2 to 10; however, another substituent may be used as long as it does not impair the hydrophobic property seriously.

With respect to styrene and derivatives thereof, examples include: styrene, $\alpha$-methyl styrene, $\alpha$-ethyl styrene and those compounds in which the benzene ring of these styrene and its derivatives has a substituent that does not impair the hydrophobic property seriously or a substituent for further increasing the hydrophobic property. Moreover, with respect to vinyl naphthalene and its derivatives, examples thereof include vinyl naphthalene and those vinyl naphthalenes in which the naphthalene ring has a substituent that does not impair the hydrophobic property seriously or a substituent for further increasing the hydrophobic property.

Among these, alkene, styrene and derivatives thereof exert a high controllability upon preparing the copolymer, and serve as useful hydrophobic monomers.

From the viewpoint of the pigment dispersing property, water-resistance and fastness of the image, the constituent unit (i) is preferably contained in the range from 15 to 55% by weight, more preferably, 25 to 40% by weight, most preferably, 29 to 37% by weight, in the copolymer.

The copolymer having the above-mentioned constituent unit of less than 15% by weight tends to cause insufficient pigment dispersing property, insufficient water-resistance as well as insufficient adhesiveness to paper and insufficient ink film strength. In contrast, the constituent unit exceeding 55% by weight tends to cause insufficient solubility to the aqueous medium, resulting in difficulty in ink formation, cloud in the ink, insoluble depositions of ink materials and unstable ink viscosity; therefore, the above-mentioned range is preferably used.

The constituent unit (ii) at least one monomer selected from monomers containing an acidic group that ion dissociate has a function for dissolving the copolymer in an alkali aqueous medium, and preferable examples of the above-mentioned monomer include $\alpha,\beta$-ethylenic unsaturated carboxylic acid, and specific examples thereof include methacrylic acid, acrylic acid, maleic anhydride or its monoester, fumaric acid or its monoester, itaconic acid or its monoester and crotonic acid. In particular, methacrylic acid and acrylic acid are preferably used for achieving the above-mentioned effects as the ink composition of the present invention.

The constituent unit (ii) is preferably contained in the range from 9 to 28% by weight, more preferably, 12 to 21% by weight, most preferably, 14 to 18% by weight, in the copolymer. The constituent unit less than 9% makes it difficult for the copolymer to dissolve in an aqueous medium (having an alkali property), failing to provide a micelle aggregation solution in a stable manner. In contrast, the constituent unit exceeding 28% by weight tends to impair the water-resistance and fastness of a recorded image; therefore, the above-mentioned range is preferably used.

The constituent unit (iii) at least one $\alpha,\beta$-ethylenic unsaturated carboxylic acid alkyl ester forms a component giving flexibility to the copolymer, and this component is contained so that it becomes possible to preferably form the micelle aggregation, and also to minimize deviations in the diameter of the micelle aggregation. The alkyl group of $\alpha,\beta$-ethylenic unsaturated carboxylic acid alkyl esters is allowed to have 1 to 20 carbon atoms, more preferably, 2 to 10. Examples thereof include: methacrylic acid esters, such as methyl methacrylate, ethyl methacrylate and butyl methacrylate, acrylic acid esters, such as methyl acrylate, ethyl acrylate and butyl acrylate, maleic acid esters, such as dimethyl maleate and diethyl maleate, and fumaric acid esters such as dimethyl fumarate and diethyl fumarate.

From the viewpoint of the formation of the micelle aggregation and deviations in the diameter of the micelle aggregation to be formed, the constituent unit (iii) is preferably contained the range from 20 to 75% by weight, more preferably, 35 to 65% by weight, most preferably, 45 to 60% by weight, in the copolymer.

Moreover, with respect to the copolymer of the invention, in addition to the above-mentioned three kinds of constituent units, another copolymer unit may be contained as long as it is set in a range so as not to impair the formation of the micelle aggregation in accordance with the invention.

With respect to the copolymer used in the invention, either a random copolymer or a block copolymer may be used. From the viewpoint of the pigment dispersing property of the aqueous ink composition and the controllability in the preservation of the aqueous ink composition, the block copolymer may be preferably used; however, from the viewpoint of the easiness in preparation of the aqueous ink composition and reduction in the deviations of the pigment dispersing property in the aqueous ink composition, it is preferable to use the random copolymer.

From the viewpoint of strength of an image coat film and adhesive strength thereof, a number average molecular weight of the copolymer is preferably in the range of 6,000 to 30,000. More preferably, the number average molecular weight is set in the range of 13,000 to 22,000. The number average molecular weight lower than 6,000 tends to cause powdered copolymer, resulting in uneven image coat films and degradation in the water-resistance (fastness) of the image coat film. In contrast, the number average molecular weight higher than 30,000 tends to cause insufficient solubility in the aqueous medium, resulting in a failure to raise the solid component concentration of the dispersion solution to an appropriate value, cloud in the solution and the subsequent deposition, an increase in the solution viscosity and degradation in the smoothness of the image coat film surface.

Moreover, the copolymer of the invention is preferably set to have a glass-transition point lower than 120° C., and from the viewpoint of environmental safety, it is preferably set in the range of 35° C. to 70° C. Moreover, a material having such thermal characteristics that its fluidity starting point is lower than 180° C. with its decomposing point being higher than 150° C. may be used; thus, it becomes possible to widen the degree of control margin and also to provide an image coat film having a high light-transmitting property.

The acid value of the copolymer of the invention is preferably set in the range of 60 to 160, more preferably, 90 to 140, most preferably, 100 to 130. The acid value of the copolymer lower than 60 causes insufficient solubility in the aqueous medium, resulting in a failure to raise the solid component concentration of the dispersion solution to an appropriate value, cloud in the solution and the subsequent deposition, and an increase in the solution viscosity. Moreover, the acid value of the copolymer greater than 160 tends to cause degradation in the water-resistance in the image coat film, insufficient image density and image running.

Here, in general, acidic paper is often used as copying paper and ink-jet paper. For this reason, in the case when an image coat film is formed on acidic paper by using a copolymer having an acid value of not more than 160 (with less ionic portion), the copolymer is highly susceptible to the influences from $H^+$ ions on the acidic paper, and in a solid-state with a dried image coat film, the solubility to water becomes very low, making it possible to provide superior water-resistance in the image coat film (even when the image gets wet with water for a short time, the image is not adversely affected with a high image-fixing property).

Preparation of Micelle Aggregation

The micelle aggregation of the invention is prepared by using, for example, the following method. In order to obtain a fine micelle aggregation having an even diameter, a solution containing the above-mentioned copolymer, alkali and aqueous medium was stirred while being maintained at a temperature higher than the glass transition point of the above-mentioned copolymer by not less than 15° C.

First, the alkali content of the above-mentioned solution was preferably set to an amount so as not to completely neutralize the acidic group upon neutralizing the acidic group of the copolymer by using the alkali. More specifically, the amount is preferably set to an amount that is less than the amount (equivalent) that can neutralize all the acidic groups of the copolymer by 2 equivalent % to 30 equivalent %, more specifically, an amount that is less than the amount by 6 equivalent % to 15 equivalent %. By using an amount that is less than the equivalent amount by 2 equivalent % to 30 equivalent %, it is possible to prepare a fine micelle aggregation having an even diameter. When the alkali content is greater than the amount that is less than the equivalent amount by 2 equivalent %, it becomes difficult to control the diameter of the micelle aggregation, resulting in a failure to form the micelle aggregation and a widened diameter distribution of the micelle aggregation. The resulting problems are deterioration in the pigment dispersion stability and degradation in the color characteristics of the image. In contrast, when the alkali content is smaller than the amount that is less than the equivalent amount by 30 equivalent %, an undissolved portion might be produced at last, or thick cloud occurs in the solution, with the result that it sometimes becomes difficult to prepare a micelle aggregation solution having a required solid component concentration.

With respect to an alkali material to be used, examples thereof include: alkali metal hydroxides such as NaOH and KOH, TMAH, TEAH, ammonia, ammonium-based compounds, quaternary ammonium-based compounds and amine-based compounds.

With respect to the temperature upon stirring the solution, the temperature of the solution is preferably set to a temperature higher than the glass transition point of the applied copolymer by not less than 15° C. More preferably, the temperature is set to a temperature higher than the point by not less than 25° C.; however, in the case when the corresponding temperature reaches the proximity of the boiling point of water, it is effective to mix a high boiling-point solvent of a polyhydric alcohol type that is azeotropic, and highly soluble to water therein.

Even in the case when the alkali amount has been adjusted as described above, if the temperature of the solution is lower than a temperature higher than the glass transition point of the copolymer by 15° C., a cloudy white solution having an average particle size of not less than 300 nm is generated, and this solution fails to make the diameter of the dispersion pigment smaller, and tends to cause an aggregation, making the micelle aggregation include too much pigment to become heavier and to cause degradation in the long-term dispersion stability.

The stirring time is appropriately set to 2 to 6 hours. Upon stirring the solution, it is not necessary to particularly apply a strong shearing force. Therefore, with respect to the stirring device, a well-known device may be used without limitation. For example, not only a propeller stirring method and a rotor stirring method, but also a vibration stirring method using ultrasonic waves may be adopted. In the case of the ultrasonic-wave stirring method, a copolymer to be used is preferably set to have a glass transition point in a range from 10° C. to 120° C., and the copolymer solution is preferably stirred in a temperature range of 20° C. to 50° C., more preferably, 30° C. to 50° C., higher than the glass transition point, with ultrasonic-wave vibration being applied thereto.

Pigment

With respect to the pigment to be dispersed as the color material, pigments, such as organic pigments, inorganic pigments and metal-containing pigments, may be used, and one kind of these may be used, or a plurality of kinds of these may be used in a mixed manner. With respect to the organic pigment, preferable examples thereof include: azo-based pigments, naphthol-based pigments, indolinone-based pigments, anthraquinone-based pigments, indigo-based pigments, dioxazin-based pigments, quinacridone-based pigments, phthalocyanine-based pigments, diketopyrrolo-based pigments and perylene-based pigments. With respect to the inorganic pigments, preferable examples include: carbon-black-based, zinc-oxide-based, titanium-oxide-based and iron-oxide-based pigments, as well as ultramarine blue and metal powder.

The number average particle size (primary particle diameter) of the pigment particles is preferably set in a range from 2 nm to 200 nm, more preferably, 30 nm to 100 nm. In the case of the range from 2 nm to 200 nm, it is possible to improve the pigment dispersion stability, also to improve the transparent property of the image coat film, to widen the color reproduction range of the image portion, and consequently to provide a printed image with high color tones and high saturation.

In the aqueous ink composition of the invention, any pigment may be used with a desirable pigment dispersing property. Consequently, it is not necessary to particularly use a self-dispersion-type pigment or a pigment having ion groups on its surface. Moreover, it is possible to provide a superior dispersing property with respect to metal compound particles that are allowed to contain a hydrophilic group through a surface treatment. The invention provides a particularly superior dispersion effect in the case when an organic pigment which has a hydrophobic property on the surface, and is normally difficult to be dispersed is adopted (additionally, the self-dispersion-type pigment tends to cause a disturbance in the ionic state on the surface of the pigment particle, resulting in a failure to provide a preferable dispersing property).

The pigment, as it is, or as a pigment dispersion material, may be added to the micelle aggregation solution. Thereafter, this may be temporarily subjected to a strong dispersing process by using a device such as a homogenizer and a blast mill.

The invention makes it possible to obtain a preferable pigment dispersing property and long-term dispersion stability by dispersing a pigment in a solution containing the micelle aggregation having a diameter set in the above-mentioned range.

Preparation of Aqueous Ink Composition

With respect to the preparation method of the aqueous ink composition, although not particularly limited, it is preferable to disperse a pigment or its dispersion material in a colloid solution of the micelle aggregation formed as described above. The dispersing process of the pigment into the micelle aggregation solution is carried out by using one or a plurality of methods such as a beads mill method, a roll mill method, an ultrasonic-wave dispersion method, a jet-mill method and a homogenizer method.

In order to increase the precision of the dispersing process, for example, a centrifugal separation method serving as a classifying process or a multi-stage pressure filtration classifying method using filters having different types of opening diameters may be adopted.

The aqueous ink composition of the invention may contain a pigment up to approximately 35% by weight. Moreover, it may also contain a copolymer up to approximately 35% by weight. For example, in the case of an ink-jet recording ink, the pigment is set in the range of approximately 1 to 35% by weight, more preferably, 2 to 10% by weight, and in the case of a print ink, the pigment is set in the range of approximately 5 to 35% by weight, more preferably, 10 to 25% by weight. Furthermore, in the case of an ink-jet recording ink, a content of the copolymer is 0.1 to 35% by weight, more preferably, 1 to 5% by weight, and in the case of a print ink, the content of the copolymer is in the range of 10 to 35% by weight, more preferably, 15 to 30% by weight.

Moreover, in the case of the ink-jet recording ink, the ratio (by weight) of the pigment and the copolymer is preferably set to 10:0.1 to 10:20, more preferably, 10:1 to 10:5. Moreover, in the case of the print ink, the ratio (by weight) of the pigment and the copolymer is preferably set to 10:1 to 10:200, more preferably, 10:5 to 10:50.

Furthermore, another component may be added to the aqueous ink composition of the invention on demand. For example, a moisturizer may be added to the ink-jet recording ink. With respect to the moisturizer, a water soluble solution which has a boiling point of not less than 80° C. with a vapor pressure of not more than 100 mmHg is preferably used, and this is preferably added to the aqueous ink composition at approximately 5 to 65% by weight.

With respect to the moisturizer, for example, polyhydric alcohols and glycol ethers may be used; and specific examples include: ethylene glycol, diethylene glycol, polyethylene glycol, glycerin, ethylene glycol monomethyl ether, diethylene glycol monoethyl ether, triethylene glycol monomethyl ether, ethylene glycol monomethyl ether acetate, diethylene glycol monobutyl ether, carbitol, butylcarbitol, ethyl cerosolve, butyl cerosolve, 2-(2-n-butoxyethoxy)ethanol, and one kind or two or more kinds of these may be used.

Moreover, an antiseptic agent and/or an fungicide may be contained at 0.05 to 4% by weight with respect to the total amount of the aqueous ink composition.

The solid component content of the aqueous ink composition of the invention is preferably set in the range from 2 to 40% by weight, more preferably, 5 to 20% by weight.

Image Formation

After an image-forming process has been carried out by using the aqueous ink composition of the invention, specific treatments are applied to the image so that it becomes possible to further improve the image fastness such as a water resistance. For example, the effective treatments include a recording-surface treatment using an acidic solution or acidic solution mist and a corona discharging process, as well as a treatment for oxidizing the image coat film layer from the image surface.

Moreover, upon preparation of the above-mentioned alkali aqueous medium, another effective treatment may be carried out in which: an alkali agent (pH adjusting agent) having a boiling point of 40° C. to 150° C. is applied to the entire portion or one portion thereof as alkali, and the pH adjusting agent is subjected to vaporization by carrying out a simple heating process upon drying the image. This treatment makes it possible to improve the fastness of the image, and also to eliminate adverse effects, if any, caused by the pH adjusting agent to the image coat film. The pH adjusting agent is prepared as an ammonium-based compound, a quaternary ammonium compound, an amine-based compound or the like.

Those agents having a boiling point lower than 40° C. tend to be vaporized from the aqueous ink composition even at normal temperature to sometimes impair the pH stability of the aqueous ink composition; in contrast, those agents having a boiling point higher than 150° C. cannot be removed from the image coat film by using a simple heating process (low-temperature heating process), and in an attempt to increase the heating treatment temperature, a complex heating means is required and it becomes difficult to maintain the proper quality of the image-forming medium.

The concentration of the above-mentioned pH adjusting agent in the aqueous ink composition is appropriately set in the range of 50 mm moles/Kg to 20 moles/Kg, more preferably, 0.11 moles/Kg to 10 moles/Kg, most preferably, 0.66 moles/Kg to 5 moles/Kg.

The effects obtained by the above-mentioned treatments are inherent effects based upon the constituent units of the copolymer used in the invention. In other words, a copolymer having an acidic group comes to form a supernatant fluid with a deposition (separated into two phases) through a well-dissolved state (even transparent solution) and a white cloudy state (transition state from dissolution to deposition) when the pH of the solution is changed from high to low, and since the copolymer of the invention has specific constituent units in addition to the acidic group, the pH range in which the above-mentioned white cloudy solution is generated is narrowed with an abrupt transition from the well-dissolved state to the precipitated deposition state. For this reason, when the above-mentioned treatments (the application of acidic mist to an image coat film, the heating vaporization process of a volatile pH adjusting agent and the like) are carried out, even a slight drop in the pH makes an abrupt reduction in the solubility of the copolymer, thereby improving the fastness of the image such as the water-resistance.

In the copolymer, when the transition phenomenon from the dissolved state to the supernatant fluid state with a deposition is allowed to occur within an amount of the pH change of 2.5, more preferably, within 1.0, the above-mentioned treatments make it possible to provide a desirable water-resistance.

The pH characteristic of the above-mentioned copolymer is evaluated by using "an EQCM method" which is an electrochemical phenomenon analyzing method. An EQCM measuring device has an arrangement in which: a copolymer solution, which is measured in its pH characteristic, is loaded in a container, and a sensor (having a quartz vibrator and an action electrode), an opposing electrode and a reference electrode, which are connected to a voltage-applying device, are placed in the solution so that the applied voltage between the opposing electrode and the action electrode is changed to examine the amount of change in the adhesion of the copolymer onto the action electrode.

The copolymer solution is preferably designed so that the transition phenomenon from the dissolved state to the supernatant fluid state with a deposition is allowed to occur with even a small amount of the pH change and so that the copolymer, once deposited, is maintained in its deposited state in spite of a rise in the pH; thus, the copolymer solution is preferably allowed to exert a hysteresis characteristic. The copolymer solution having such a characteristic produces a deposition of a copolymer film abruptly (for example, on the anode electrode of +1.8 V) even upon receipt of a slight increase in the hydrogen ion concentration in the change of the applied voltage and copolymer adhesion amount based upon the above-mentioned EQCM method, and even when the hydrogen ion concentration of the solution is made lower than this (for example, a voltage drop from +1.0 V to +0.2 V) or when the pH is further changed to a higher hydroxide ion concentration range (for example, a rise from −0.5 V to −1.5 V), the copolymer film deposited on the anode electrode is maintained without being dissolved.

Since the copolymer of the invention is provided with the above-mentioned constituent units, it is allowed to exert a hysteresis characteristic so that this characteristic greatly contributes to the water-resistance of the image coat film. In addition to the water-resistance, it is possible to improve the cohesion of the image coat film, and also to alleviate a reduction in the image density, a reduction in the fastness of the image and running of the image.

When the copolymer of the invention has a carboxylic group as the acidic group, it is possible to increase the hysteresis characteristic.

Moreover, when the pH of the aqueous ink composition containing the copolymer having such a hysteresis characteristic is preferably set in a pH range that is higher than the pH point (white-cloud starting pH point) at which the dissolved state is turned into the supernatant fluid state with a deposition, by 0.5 to 4.0, more preferably, the pH range that is higher by 1.0 to 3.0, it is possible to obtain the fastness of the image coat film against the aqueous medium (application of the water-resisting function), to increase the cohesion of the image coat film, and also to reduce degradation in the image density and running of the image.

Moreover, in the case of acidic paper that is often used as printing paper, high-quality paper and ink-jet paper, it is possible to obtain a water-resistance without the necessity of positive acidic treatments such as application of acidic mist onto the image coat film. In this case, even after ink has been adhered to the paper, the acidic component of the paper is dispersed or shifted into the image coat film during a drying process to improve the fastness of the image coat film.

Moreover, a copolymer having a carboxyl group tends to cause a Kolbe reaction or a cross-linking reaction inside the copolymer at a temperature of not less than 70° C., more preferably, not less than 150° C., resulting in a reduction in the number of carboxyl groups and the subsequent great drop in the solubility of the copolymer to water. By utilizing this phenomenon, after an image-forming process, the image is subjected to a heating process in a temperature range of 50° C. to 150° C., more preferably, 70° C. to 110° C.; thus, it becomes possible to improve the water-resistance of the image efficiently.

EXAMPLES

The following description will discuss the present invention in detail based upon examples; however, the invention is not intended to be limited by these examples.

Example 1

A copolymer (200 g) (random ternary copolymer of styrene-acrylic acid-hexyl acrylate: weight-average molecular weight 19,000, copolymer ratio (weight)=36/18/46, acid value 120, glass transition point 55° C., fluidity starting point 90° C., decomposition point 237° C., deposition starting point pH 5.8), 750 g of distilled water and 21 g of potassium hydroxide are gradually dissolved while being mixed, and the resulting solution is subjected to a dissolving and colloid-solution preparing process by using a three-one motor propeller stirring device for 5 hours and 30 minutes while being heated to 89° C. Finally, the solution is concentration-adjusted to prepare a colloid water solution having a solid-component concentration of 20% by weight (with an average colloid diameter of 52 nm, pH 8.1).

This colloid solution and a copper phthalocyanine blue ultra-fine particle pigment (primary average particle size: 32 nm) are mixed at a solid component ratio of 4:6, and to this is added diethylene glycol so that the solution after the addition is set to 20% by weight, and dispersed by using a forceful pressure-type pigment dispersing device. The particle size of the dispersed pigment is measured by using a laser scattering fine-particle diameter measuring device to find that the average particle size is 76 nm.

To this are further added distilled water, diethylene glycol, potassium hydroxide and an fungicide, and this is subjected to a pressure filtering process with a mesh of 1 μm diameter to obtain a cyan ink-jet ink solution having a pH value of 8.2, a pigment concentration of 4% by weight, a copolymer concentration of 2.7% by weight and 16% by weight of ethylene glycol.

This is evaluated in its printing characteristics by using a commercial ink-jet printer. A solid print is formed on high-quality paper, and in a solid image portion after a drying process, the cyan optical reflection density is 1.65. Even when the image portion is rubbed with a white cloth, no separation of the pigment is observed. Moreover, this image recorded paper is immersed in distilled water for 10 minutes, and the image density is evaluated to find that the optical reflection density is 1.64, without any degradation being observed. Moreover, it is possible to provide superior image-quality characteristics without causing any running and irregularities in the image.

Next, the printing head portion of a commercial ink-jet printer is taken out, and 100 head portions are filled with the above-mentioned cyan ink, and these are left for three weeks under environments at a temperature of 30° C. with a humidity of 50% for three weeks; thus, after these have been wiped once, these are evaluated with respect to printing discharge processes and deviations in print positions to find that no nozzle clogging is found with a discharging rate of 100%, that a discharge rate with discharge position deviations of not less than 100 μm is 4%, and that print position deviations of all the nozzles after three wiping processes are set within 50 μm; thus, it is possible to obtain a superior printing process.

Moreover, immediately after the preparation of the ink-jet ink solution, the viscosity thereof has been set to 2.5 mPa·s; however, the viscosity reaches 2.7 mPa·s after this has been stored at normal temperature for 2 months. Thus, no undesired viscosity increase is observed in practical use.

Comparative Example 1

The copolymer (200 g), used in Example 1, 750 g of distilled water and 21 g of potassium hydroxide are gradually dissolved while being mixed, and the resulting solution is subjected to a dissolving and colloid-solution preparing process by using a three-one motor propeller stirring device for 5 hours while being heated to 65° C. Finally, the solution is concentration-adjusted to prepare a colloid water solution having a solid-component concentration of 20% by weight (with an average colloid diameter of 360 nm, pH 7.9). The resulting colloid solution has a milky white color because of the presence of giant micelles (approximately, 500 nm).

This colloid solution and a copper phthalocyanine blue ultra-fine particle pigment are mixed at a solid component ratio of 4:6, and to this is added diethylene glycol so that the solution after the addition is set to 15% by weight, and dispersed by using a forceful pressure-type pigment dispersing device. The particle size of the dispersed pigment is measured by using a laser scattering fine-particle diameter measuring device to find that the average particle size is 450 nm. To this are further added distilled water, diethylene glycol, potassium hydroxide and an fungicide, and this is subjected to a pressure filtering process with a mesh of 1 μm diameter to obtain a cyan ink-jet ink solution having a pH value of 8.0, a pigment concentration of 4% by weight, a copolymer concentration of 2.7% by weight and 16% by weight of ethylene glycol.

This is evaluated in its printing characteristics by using a commercial ink-jet printer. A solid print is formed on high-quality paper, and in a solid image portion after a drying process, the cyan optical reflection density is 1.41. After this image recorded paper has been immersed in distilled water for 10 minutes, the optical reflection density, that is, the image density, is evaluated to find that the value is lowered to 1.31 to show degradation due to water. Moreover, with respect to the image-quality characteristics, there are running and irregularities in some portions of the image.

Next, the printing head portion of a commercial ink-jet printer is taken out, and 100 head portions are filled with the above-mentioned cyan ink, and these are left for three weeks under environments at a temperature of 30° C. with a humidity of 50% for three weeks; thus, after these have been wiped once, these are evaluated with respect to printing discharge processes and deviations in print positions to find that a discharge rate of 85% is obtained, with a discharge rate in the case of discharge position deviations of not less than 100 μm being set to 35%.

Moreover, immediately after the preparation of the ink-jet ink solution, the viscosity thereof has been set to 5.1 mpa·s; however, the viscosity becomes 7.3 mPa·s after this has been stored at normal temperature for 2 months, resulting in an unstable ink-discharging characteristic with insufficient ink characteristics.

Comparative Example 2

The same processes as Example 1 are carried out except that in Example 1, 21 g of potassium hydroxide is changed to 40 g to prepare a copolymer solution as a transparent solution; however, no micelle aggregations are obtained. A pigment is dispersed in the copolymer solution in the same manner as Example 1 to prepare an ink-jet ink solution in the same manner as Example 1.

Immediately after the preparation of the ink-jet ink solution, the viscosity thereof has been set to 3.2 mPa·s; however, the viscosity rises to 5.8 mPa·s after this has been stored at normal temperature for 2 months, resulting in a failure to carry out a stable ink-discharging process.

Comparative Example 3

The same processes as Example 1 are carried out except that, in Example 1, a random ternary copolymer of styrene-acrylic acid-hexyl acrylate (weight-average molecular weight 20,000, copolymer ratio (weight)=30/25/45, acid value 190, glass transition point 80° C., fluidity starting point 125° C., decomposition point 221° C., deposition starting point pH 4.8) is used and that the solution stirring temperature is set to 85° C., thereby preparing an ink-jet ink solution.

The copolymer solution, obtained during the preparation processes of the above-mentioned ink solution (micelle forming process), is a transparent solution, and has a completely dissolved state based upon the particle measurements, failing to form preferable micelles.

This is evaluated in its printing characteristics by using a commercial ink-jet printer. A solid print is formed on high-quality paper, and in a solid image portion after a drying process, the cyan optical reflection density is 1.47. Moreover, this image recorded paper is immersed in distilled water for 10 minutes, and the image density is evaluated to find that the optical reflection density is 1.29, which indicates degradation due to water.

Comparative Example 4

The same processes as Example 1 are carried out except that, in Example 1, a random binary copolymer of styrene-acrylic acid (weight-average molecular weight 18,000, copolymer ratio (weight)=50/50, acid value 260, glass transition point 155° C., fluidity starting point 175° C., decomposition point 210° C., deposition starting point pH 4.1) is used, thereby preparing an ink-jet ink solution.

The copolymer solution, obtained during the preparation processes of the above-mentioned ink solution (micelle forming process), is a transparent solution, and has a completely dissolved state without any micelle aggregation detected based upon the light scattering measuring method, failing to form preferable micelles.

Example 2

A copolymer (450 g) (block copolymer of α-methyl styrene-acrylic acid-butyl acrylate: weight-average molecular weight 9,000, copolymer ratio (weight)=30/15/50, acid value 108, glass transition point 39° C., fluidity starting point 76° C., decomposition starting point 209° C., deposition starting point pH 6.2), 1000 g of distilled water and 200 g of tetramethyl ammonium hydroxide (25% by weight water solution) are dissolved while being mixed, and the resulting solution is subjected to a dissolving and colloid-solution preparing process by using a three-one motor propeller stirring device for 4 hours while being heated to 90° C. Finally, the solution is concentration-adjusted to prepare a colloid water solution having a solid-component concentration of 40% by weight (with an average colloid diameter of 80 nm, pH 8.2).

This colloid solution and a copper phthalocyanine blue ultra-fine particle pigment are mixed at a solid component ratio of 5:5, and mixed and dispersed by using a high-strength roll-mill dispersing device while being heated so as to maintain the temperature of the solution at 78° C.; thus, an ink base containing a pigment is formed. This ink-base is diluted, and the dispersion pigment particle size is measured by using a laser scattering fine-particle size measuring device to find that the average particle size is 92 nm.

To this are further added distilled water, diethylene glycol, potassium hydroxide and an fungicide, and this is subjected to a pressure filtering process with a mesh of 1 μm diameter to obtain a cyan ink-jet ink solution having a pH value of 8.2, a pigment concentration of 7.1% by weight, a copolymer concentration of 3.0% by weight and 22% by weight of ethylene glycol.

Next, after an offset print has been formed on high-quality paper by using the above-mentioned ink, this is allowed to pass through a heated atmosphere at 120° C. for 2 seconds to be dried so that an ink-film hardening treatment process is carried out. The resulting product is also immersed into pure water for 5 minutes; however, neither image flowing nor reduction in the image density is confirmed.

Example 3

A copolymer (400 g) (block copolymer of α-methyl styrene-methacrylic acid-butyl methacrylate: weight-average molecular weight 17,000, copolymer ratio (weight)=36/14/50, acid value 111, glass transition point 75° C., fluidity starting point 104° C., decomposition starting point 235° C., deposition starting point pH 6.2), 11 g of potassium hydroxide and 1700 g of distilled water are dissolved while being mixed, and the resulting solution is subjected to a dissolving and colloid-solution preparing process by carrying out a high-strength forceful stirring process using a three-one motor propeller stirring device for 6 hours while being heated to 90° C. Finally, the solution is concentration-adjusted to prepare a colloid water solution having a solid-component concentration of 20% by weight (with an average colloid diameter of 32 nm, pH 8.1).

Next, this colloid solution and an azo-based red ultra-fine particle pigment are mixed at a solid component ratio of 8:2, and to this is further added diethylene glycol to be set at 20% by weight in the solution after the addition; thus, a dispersion solution containing a pigment is prepared by using a high-strength sand-mill dispersing device. The dispersion pigment particle size of this solution is measured by using a laser scattering fine-particle size measuring device to find that the average particle size is 46 nm.

To this are further added distilled water, diethylene glycol, potassium hydroxide and an fungicide, and this is subjected to a pressure filtering process with a mesh of 1 μm diameter to obtain a magenta ink-jet ink solution having a pH value of 8.0, a pigment concentration of 8% by weight, a copolymer concentration of 2.5% by weight and 26% by weight of ethylene glycol.

This is evaluated in its printing characteristics by using a commercial ink-jet printer. A solid print is formed on high-quality paper, and in a solid image portion after a drying process, the magenta optical reflection density is 1.61. Even when an image portion is rubbed, no separation of the pigment is observed. Further, after this image recorded paper has been immersed in distilled water for 10 minutes, the image density is evaluated to find that the value is 1.59 and hardly any degradation is observed. Moreover, it is possible to provide superior image-quality characteristics without causing any image running and irregularities.

Next, the printing head portion of a commercial ink-jet printer is taken out, and 100 head portions are filled with the above-mentioned magenta ink, and these are left for three weeks under environments at a temperature of 30° C. with a humidity of 40% for three weeks; thus, after these have been wiped once, these are evaluated with respect to printing discharge processes and deviations in print positions to find that no nozzle clogging is observed with a discharge rate of 100%, and that in the case of discharge position deviations of not less than 100 μm with the discharge rate being set to 3%, deviations in print positions of all the nozzles after three wiping processes are within 50 μm, thereby providing a superior printing process.

Example 4

A copolymer (400 g) (random copolymer of α-methyl styrene-methacrylic acid-ethyl acrylate: weight-average molecular weight 20,000, copolymer ratio (weight)=31/15/54, acid value 121, glass transition point 75° C., fluidity starting point 104° C., decomposition starting point 245° C., deposition starting point pH 6.2), 1000 g of distilled water and 200 g of methyl ammonium hydroxide are dissolved while being mixed, and the resulting solution is subjected to a dissolving and colloid-solution preparing process by carrying out a high-strength forceful stirring process using a three-one motor propeller stirring device and an ultrasonic vibrator in a combined manner for 3 hours while being heated to 90° C. Finally, the solution is concentration-adjusted to prepare a colloid water solution having a solid-component concentration of 27% by weight (with an average colloid diameter of 68 nm, pH value 8.1). Next, this resin solution and a carbon black ultra-fine particle pigment are mixed at a solid component ratio of 4:6, and to this is further added diethylene glycol to be set at 15% by weight in the solution after the addition; thus, a dispersion solution containing a pigment is prepared by using a high-strength sand-mill dispersing device. The dispersion pigment particle size of this solution is measured by using a laser scattering fine-particle size measuring device to find that the average particle size is 76 nm.

To this are further added distilled water, diethylene glycol, tetramethylammonium hydroxide and an fungicide, and this is subjected to a pressure filtering process with a mesh of 0.7 μm diameter to obtain a black ink-jet ink solution having a pH value of 7.9, a pigment concentration of 5.5% by weight, a copolymer concentration of 2.7% by weight and 30% by weight of ethylene glycol.

This is evaluated in its printing characteristics by using a commercial ink-jet printer. A solid print is formed on high-quality paper, and in a solid image portion after a drying process, the black optical reflection density is 1.91. Even when an image portion is rubbed, no separation of the pigment is observed. Further, after this image recorded paper has been immersed in distilled water for 10 minutes, the image density is evaluated to find that the value is 1.89 and hardly any degradation is observed. Moreover, it is possible to provide superior image-quality characteristics without causing any image running and irregularities.

Next, the printing head portion of a commercial ink-jet printer is taken out, and 100 head portions are filled with the above-mentioned black ink, and these are left for three weeks under environments at a temperature of 30° C. with a humidity of 40% for three weeks; thus, after these have been wiped once, these are evaluated with respect to printing discharge processes and deviations in print positions to find that a discharging rate of 99% is obtained and that a discharge rate with discharge position deviations of not less than 100 μm is 3%, and that print position deviations of all the nozzles after three wiping processes are set within 50 μm; thus, it is possible to obtain a superior printing process.

Example 5

A colloid solution having a solid component concentration of 32% by weight, prepared in the same manner as Example 1, is mixed with a copper phthalocyanine pigment so as to have a solid component ratio of 10:5, and dispersed by using a forceful pressure-type pigment dispersing device, and distilled water is finally added thereto so that a print ink having a solid component concentration of 40% by weight is obtained.

This print ink is stored at normal temperature for two months; however, no viscosity change is particularly observed. Moreover, when a printing process is carried out with this ink by using an offset printing method, it is confirmed that the print ink exerts sufficient performances with an image density of 1.51.

The aqueous ink composition of the invention makes it possible to increase both of the concentrations of the copolymer and the pigment without the necessity of increasing the viscosity of the solution; thus, it is possible to widen the range of the color reproduction, to obtain a high color tone image even when plain paper is used, and also to provide an image with high quality with the image having a high density without impairing other characteristics (such as an ink-jet nozzle discharging characteristic and a printing characteristic). Moreover, the image formed by using the aqueous ink composition of the invention is highly transparent, and has a wider range of color reproduction (high color-tone image), and the resulting image coat film is superior in endurance and water-resistance.

Furthermore, the aqueous ink composition of the invention makes it possible to eliminate the necessity of adding a pH buffering agent that is normally added to the ink. In addition, when the aqueous ink composition of the invention is applied to an ink-jet recording process, it is possible to improve the reliability with respect to the ink discharging property (such as nozzle clogging prevention) from the nozzle.

What is claimed is:

1. An aqueous ink composition, which comprises at least:
   1) an alkali neutralized product of a copolymer containing constituent units of:
      (i) at least one monomer selected from the group consisting of alkene, styrene, styrene derivatives, vinyl naphthalene, and vinyl naphthalene derivatives;
      (ii) at least one monomer selected from the group consisting of monomers containing an acidic group that ion dissociate; and
      (iii) at least one α,β-ethylenic unsaturated carboxylic acid alkyl ester;
   2) a pigment; and
   3) an aqueous medium,
   wherein the alkali neutralized product of the copolymer in the aqueous ink composition forms micelle aggregations with an average diameter being set in the range of 10 nm to 300 nm; and
   wherein an acid value of the copolymer is in the range of 60 to 160.

2. An aqueous ink composition according to claim 1, wherein a number average molecular weight of the copolymer is in the range of 6,000 to 30,000.

3. An aqueous ink composition according to claim 1, wherein in the copolymer, the constituent unit (i) is in the range from 15 to 55% by weight; the constituent unit (ii) is in the range from 9 to 28% by weight; and the constituent unit (iii) is the range from 20 to 75% by weight.

4. An aqueous ink composition according to claim 1, wherein primary particles of the pigment have a number average particle size of 2 to 200 nm.

5. An aqueous ink composition according to claim 1, wherein a content of the copolymer is 0.1 to 35% by weight.

6. An aqueous ink composition according to claim 1, wherein a content of the pigment is 1 to 35% by weight.

7. An aqueous ink composition according to claim 1, wherein a content of a solid component of the aqueous ink composition is in the range from 2 to 40% by weight.

8. An aqueous ink composition according to claim 1, wherein the micelle aggregations contain an aqueous medium inside thereof.

9. An aqueous ink composition according to claim 1, wherein the aqueous ink composition includes a copolymer solution, the copolymer solution transiting from a dissolved state or a colloidal state to a supernatant fluid state with a deposition when a pH of the copolymer solution is changed by no more than 2.5.

10. An aqueous ink composition according to claim 1, wherein the pH of the aqueous ink composition is adjusted to a pH area that is 0.5 to 4.0 higher than a pH point at which the copolymer generates a supernatant fluid and a deposition from a dissolved state.

11. An aqueous ink composition according to claim 1, wherein a pH adjustment is carried out by using a pH adjusting agent having a boiling point of 40° C. to 150° C.

12. An aqueous ink composition according to claim 11, wherein the addition amount of the pH adjusting agent is in the range from 50 mmol/Kg to 20 mol/Kg.

13. An aqueous ink composition according to claim 1, further comprising 5 to 65% by weight of a moisturizer, wherein the moisturizer is a water-soluble liquid and has a boiling point of no less than 80° C. with a vapor pressure of no more than 100 mmHg.

14. An aqueous ink composition according to claim 1, further comprising 0.05 to 4% by weight of an antiseptic agent and/or an fungicide.

15. A manufacturing method of an aqueous ink composition comprising at least the steps of:
    stirring a solution containing a copolymer, an alkali, and an aqueous medium, while maintaining the solution at a temperature that is higher than the glass transition point of the copolymer by not less than 15° C. so as to form micelle aggregations of an alkali neutralized product of the copolymer; and
    adding pigment fine particles to a solution containing the micelle aggregation so as to be dispersed therein,
    wherein the copolymer contains constituent units of:
    (i) at least one monomer selected from the group consisting of alkene, styrene, styrene derivatives, vinyl naphthalene, and vinyl naphthalene derivatives;
    (ii) at least one monomer selected from the group consisting of monomers containing an acidic group that ion dissociate; and
    (iii) at least one $\alpha,\beta$-ethylenic unsaturated carboxylic acid alkyl ester.

16. A manufacturing method of an aqueous ink composition according to claim 15, wherein an amount of the alkali is less than the amount that is equivalent for neutralizing the total acidic groups in the copolymer by 2 equivalent % to 30 equivalent %.

17. A manufacturing method of an aqueous ink composition according to claim 15, wherein the copolymer has a glass transition point in the range from 10° C. to 120° C., the temperature of the solution during stirring is maintained at a temperature higher than the glass transition point by 20° C. to 50° C., and the solution is stirred with applying ultrasonic vibration.

18. An image forming method, wherein an image is formed on a image formation surface of a recording medium by using an aqueous ink composition and then a heating process is carried out onto the image formation surface of the recording medium at a temperature of 50° C. to 150° C., the aqueous ink composition comprising at least:
    1) an alkali neutralized product of a copolymer containing constituent units of:
    (i) at least one monomer selected from the group consisting of alkene, styrene, styrene derivatives, vinyl naphthalene, and vinyl naphthalene derivatives;
    (ii) at least one monomer selected from group consisting of monomers containing an acidic group that ion dissociate; and
    (iii) at least one $\alpha,\beta$-ethylenic unsaturated carboxylic acid alkyl ester;
    2) a pigment; and
    3) an aqueous medium,
    wherein the alkali neutralized product of the copolymer in the aqueous ink composition forms micelle aggregations with an average diameter being set in the range of 10 nm to 300 nm; and
    wherein an acid value of the copolymer is in the range of 60 to 160.

19. An aqueous ink composition, which comprises at least:
    1) an alkali neutralized product of a copolymer containing constituent units of:
    (i) at least one monomer selected from the group consisting of alkene, styrene, styrene derivatives, vinyl naphthalene, and vinyl naphthalene derivatives;
    (ii) at least one monomer selected from the group consisting of monomers containing an acidic group that ion dissociate; and
    (iii) at least one $\alpha,\beta$-ethylenic unsaturated carboxylic acid alkyl ester;
    2) a pigment; and
    3) an aqueous medium,
    wherein the alkali neutralized product of the copolymer in the aqueous ink composition forms micelle aggregations with an average diameter being set in the range of 10 nm to 300 nm; and
    wherein in the copolymer, the constituent unit (i) is in the range from 15 to 55% by weight; the constituent unit (ii) is in the range from 9 to 28% by weight; and the constituent unit (iii) is the range from 20 to 75% by weight.

* * * * *